United States Patent [19]

Feng

[11] Patent Number: 4,461,177

[45] Date of Patent: Jul. 24, 1984

[54] ACOUSTIC EMISSION TRANSDUCER PACKAGE

[75] Inventor: Ching C. Feng, San Juan Capistrano, Calif.

[73] Assignee: Dunegan Corporation, Mission Viejo, Calif.

[21] Appl. No.: 402,705

[22] Filed: Jul. 28, 1982

[51] Int. Cl.³ ............................................. G01N 22/02
[52] U.S. Cl. ........................................ 73/587; 73/654
[58] Field of Search ................ 73/587, 654, 653, 652, 73/517 R; 310/329

[56] References Cited

U.S. PATENT DOCUMENTS

| | | | |
|---|---|---|---|
| 3,285,074 | 11/1966 | Elazar | 73/517 R |
| 3,474,403 | 10/1969 | Massa et al. | 310/329 |
| 3,855,847 | 12/1974 | Leschek | 73/587 |
| 4,359,658 | 11/1982 | Cartier | 310/329 |

OTHER PUBLICATIONS

Information Packet on the NBS Conical Transducer for Acoustic Emission, Dec. 1981, National Bureau of Standards.

*Primary Examiner*—Jerry W. Myracle
*Attorney, Agent, or Firm*—Knobbe, Martens, Olson & Bear

[57] ABSTRACT

An improved acoustic emission transducer is provided for sensing surface flat frequency response displacement waveforms which transducer is arranged in a packaged form to provide a device of rugged construction which is substantially immune to rough handling, which is smaller in size, and which is easy to use. The arrangement includes a sensor element mounted with an inertia mass comprised of a material substantially matching the impedance of the sensing element, and of substantial size in order to clamp one phase of the sensor element from high frequency motions. The device is mounted in a housing under a continuously applied positive pressure or force in order to maintain the sensor element in the clamped position regardless of orientation of the transducer, which has the effect of reducing undershoot, among other things, in the output response signal produced by the transducer.

14 Claims, 4 Drawing Figures

ACOUSTIC EMISSION TRANSDUCER PACKAGE

BACKGROUND AND STATEMENT OF THE INVENTION

This invention relates generally to improvements in electromechanical acoustic emission detectors or transducers for detecting acoustic emission signals that are emitted by solid objects with those signals being caused, for example, by cracking or failure in some way in the solid object of interest, and converting the signals obtained into electrical signals having components of corresponding frequency. The electrical signals are converted, for example, into computer readouts for determining the degree of acoustic emission signal being emitted. This invention relates particularly to an improvement in an arrangement of acoustic emission transducer for measuring surface displacement waveforms as developed by the National Bureau of Standards (NBS) and reported in their report of December, 1981, entitled "Information Packet on the NBS Conical Transducer for Acoustic Emission," which report is incorporated by reference in its entirety herein.

The phenomenon of acoustic emission, to which the present invention relates, is concerned with the detection of elastic waves that are emitted from a source within an object and become manifest at positions remote from the source. Such waves are developed, for example, in the cracking of a pressure vessel shell either internally, or on the surface when it is failing or deteriorating, or in failure in the welding of joints of the plates or other parts making up or forming the device of interest. Acoustic emission signals are also emitted from various points of an object of interest spontaneously at various times. However, generally acoustic emission occurs as a result of growth of cracks in a device, in failing, and such cracks may arise from application of various kinds of forces including mechanical pressure or temperature changes, or even by deterioration caused by chemical action on the structure involved.

The location of cracks and other sources of acoustic emission has been determined by acoustic emission detector arrays for many years generally by locating acoustic emission detectors at various points on the surface of the structure being investigated, detecting the signals received and the relative times of arrival of the signals to the various respective detectors, and then either manually or automatically calculating the origin of the acoustic emission signals by triangulation or similar methods, taking into account the relative times of arrival of the stress waves, for example, being detected at the detectors and the propagation speed of those waves. The severity of the source of the acoustic emission signal is determined by observing the strength of the waves arriving at the detectors such as, for example, by counting the number of pulses or groups of pulses detected in a given interval of time or over an extended time.

As will be appreciated, in the environment of the object under consideration, many other sound generated signals may occur simultaneously in the operation of the object, for example, or in the operation of equipment adjacent to the object under consideration. These signals constitute noise, and therefore, if also detected, may obscure the acoustic emission signals being read. For this reason, various methods have been developed for improving the signal to noise ratio, and many arrangements of apparatus have been devised to enhance the pick-up of the signals of interest developed from acoustic emissions. It is to this application that the present invention is directed of an improved transducer for sensing surface flat frequency response displacement waveforms which is packaged to provide a device of rugged construction, which may be handled easily in any orientation. The device is much smaller in size and easier to use because the signal is substantially less distorted and more information is obtainable.

The present invention includes a housing for mounting the transducer instrument with that instrument including a sensor element in the form of a piezoelectric crystal, with that crystal being mounted in a housing under a continuously applied bias pressure and the use of an inertia mass of high mechanical impedance, and of sufficient size to clamp one face of the crystal from the high frequency motions experienced by the other face of the crystal. With such an arrangement, it has been established that the voltage output of the crystal will be proportional to the displacement of the other face of the crystal. Included in the housing, on the opposite side of the mass from the crystal, is an elastomer bulk for holding the inertia mass in place, absorbing jolts, and for continuously applying the desired force or pressure against the crystal.

In those instances where the structure under consideration is steel, which is a very common structural material for pressure vessels and structures where acoustic emission signals are of interest, the housing for the instrument, in accordance with this invention, is comprised of stainless steel, and preferably corrosion-resistant stainless steel. Also it may be non-magnetic and austenitic. Such material is easy to weld and to machine into the very accurate dimensions required for the instrument of the invention. The inertia mass is comprised of a material selected to have the highest available mechanical impedance of the crystal utilized as the piezoelectric sensor element. Preferably, the inertia mass is comprised of a tungsten alloy such as a tungsten-carbide alloy.

Material suitable for use as piezoelectric elements include ceramic polycrystalline materials which are polarizable, as well as natural piezoelectric crystals. Such ceramic materials include barium titanate, lead-zirconate, lead metaniobate, bismuth titanate, and mixtures thereof with each other or with other suitable materials. Natural crystals for use in the invention include quartz and lithium niobate, etc. Preferably, the crystal utilized in accordance with this invention is lead-zirconate-titanate.

The crystal may have several forms of shape, including a plate-like form, a bar form, or a truncated cone as with the NBS device. Preferably with this invention, the crystal is a plate form, cylindrical in shape, with a diameter of substantially about 0.05 inches and a thickness of substantially about 0.025 inches.

In connection with the development of an instrument for use according to the invention here, in combination with the lead-zirconate-titanate combination sensor crystal, it has been found that the inertia mass is preferably comprised of Densalloy, a tungsten base heavy alloy, and a product of Teledyne Powder Alloys of Clifton, N.J.

This invention will now be described in more detail and other objects and advantages thereof will become apparent from the following description, the accompanying drawings, and the appended claims.

DETAILED DESCRIPTION OF THE INVENTION

Figure 1:
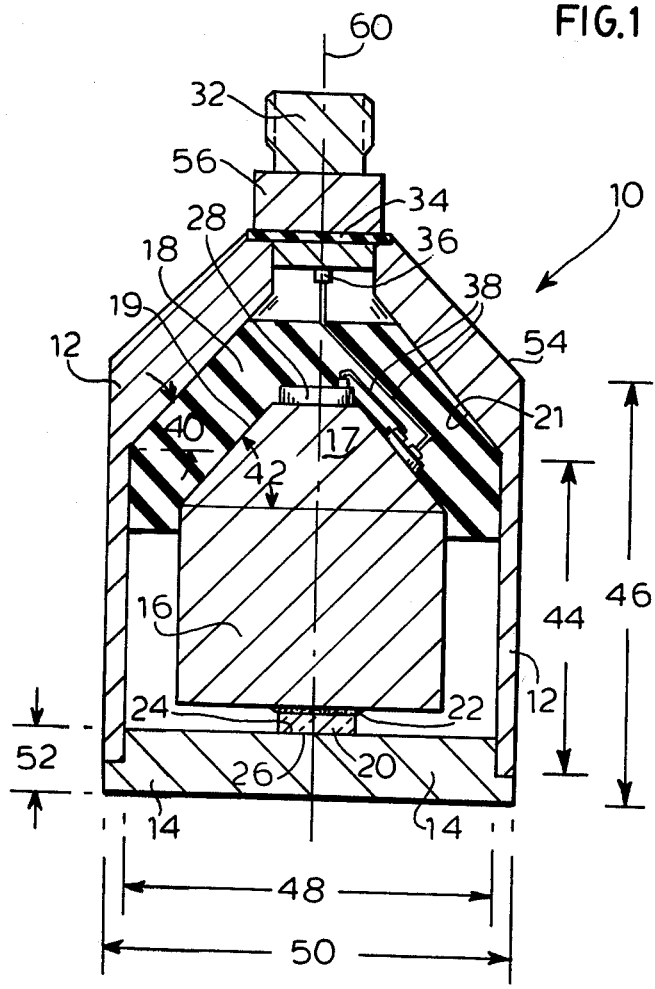
FIG. 1 is a vertical sectional view of the improved acoustic emission transducer package illustrating the invention taken along lines 1—1 of FIG. 2.

Referring to the drawings in which like reference characters refer to like parts throughout the several views thereof, FIG. 1 shows the transducer package of the invention in a vertical cross-sectional view with a housing 12 preferably comprised of a corrosion-resistant stainless steel for use in developing acoustic emission signals from a steel structure. It may be nonmagnetic, as discussed above. The housing 12 is cylindrical with a truncated conical upper surface 54 and includes a bottom closure or base 14. Mounted on base 14 is a piezoelectric crystal 20 as the sensing element for sensing acoustic emission signals eminating from a structure upon which base 14 is situated. As mentioned above, crystal 20 is preferably cylindrical, and comprised of the combination material lead-zirconate-titanate.

Mounted above crystal 20 is an inertia mass or backing 16 which is, preferably, a material selected to have the highest impedance available relative to the crystal material 20 and is, preferably, a tungsten alloy such as Densalloy, mentioned above. Mass 16 is cylindrical in form with a truncated upper portion 17 forming a conical upper surface 19 which surface 19 is at an angle 42 of about 45° from the horizontal, as is angle 40 formed between the inner surface 21 of the upper portion of casing 12 and the horizontal.

An adhesive such as an epoxy 22 is applied to either the top or the lower surface of crystal 20 to fix one surface thereof against the adjacent surface. As shown in FIG. 1, the adhesive 22 joins the top surface of crystal 20 with the bottom surface of the inertia mass 16. The joined surfaces may be joined, for example, with DuPont's Number 815, which is an epoxy. The unbound bottom surface 26 of the crystal 20 is in intimate contact with the top surface 24 of base 14 through the use of a conventional transducer couplant, such as Dow Corning FS1265, for example. It will be appreciated, that mass 16, crystal 20 and housing 12 with associated base 14 are all coaxial. In this connection, crystal 20 is preferably cylindrical with a diameter of 0.05 inches and a vertical dimension or thickness of 0.025 inches.

Wedged between the truncated upper surface 17 of inertia mass 16 and the inner angled surface 21 of casing 12 is an elastomer body 18 which serves to cushion the mounting of mass 16 and sensor element 20, as well as to apply a constant positive pressure in order to maintain mass 16 and crystal 20 so that the lower surface 26 of crystal 20 is in intimate contact with the upper surface 24 of base 14 at all times even under jarring conditions, or different orientations of the device.

As can be seen further in FIG. 1, casing 12 includes an upper closure arrangement 56 with a metallic structure 32 for connecting the device to appropriate equipment for picking up and evaluating the electrical signals eminating from the device of the invention. Positioned between the closure 56 and the upper surface 54 of casing 12 is a dialectric material 34 as an insulator.

The package structure of the invention includes an integral electronic pre-amplifier 28 which, as will be appreciated, serves to drive the signal produced for subsequent readings on the equipment. Connected between mass 16, and pre-amp 28 and a terminal 36 are the usual appropriate connecting leads 38.

As representative of the dimensions of the packaging device of the invention, one may note that the diameter 50 of the casing structure 12 is one inch while the dimension 48 which is the internal dimension of casing 12 in the cylindrical portion thereof is 0.90 inches. Further, the vertical dimension 44 is 0.75 inches while the vertical dimension 46 is 0.85 inches. It will be appreciated that these dimensions are being presented as representative only and the invention is not limited to size dimensions as specifically mentioned above.

Figure 2:
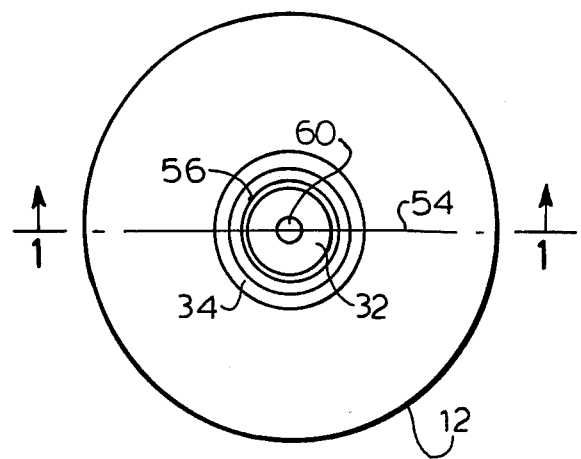
FIG. 2 is a top plan view of the package mounting of the invention showing the tubular form of the package with the lead connection arrangement at the top.

As can be seen in FIG. 2, the top plan view shown of the device of the invention indicates the cylindrical form of the device of the invention and to the coaxial positioning of the various parts thereof, on the axis 60 as shown in FIG. 1.

Figure 3:
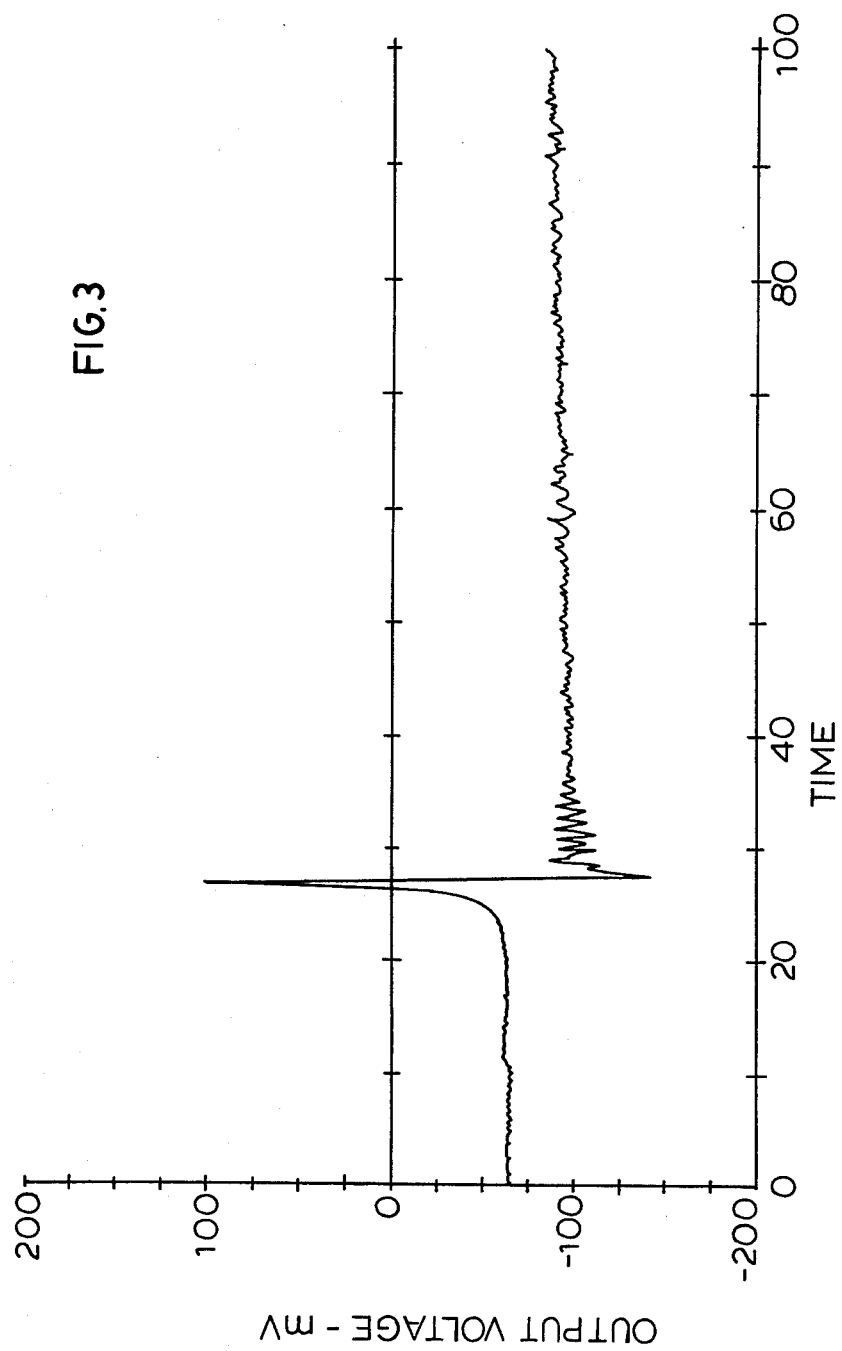
FIG. 3 is a graph prepared from the output of the NBS device described in the article referred to above with the graph showing measured voltage output versus time for the NBS conical transducer on a point-force-step function on a large steel block.
Figure 4:
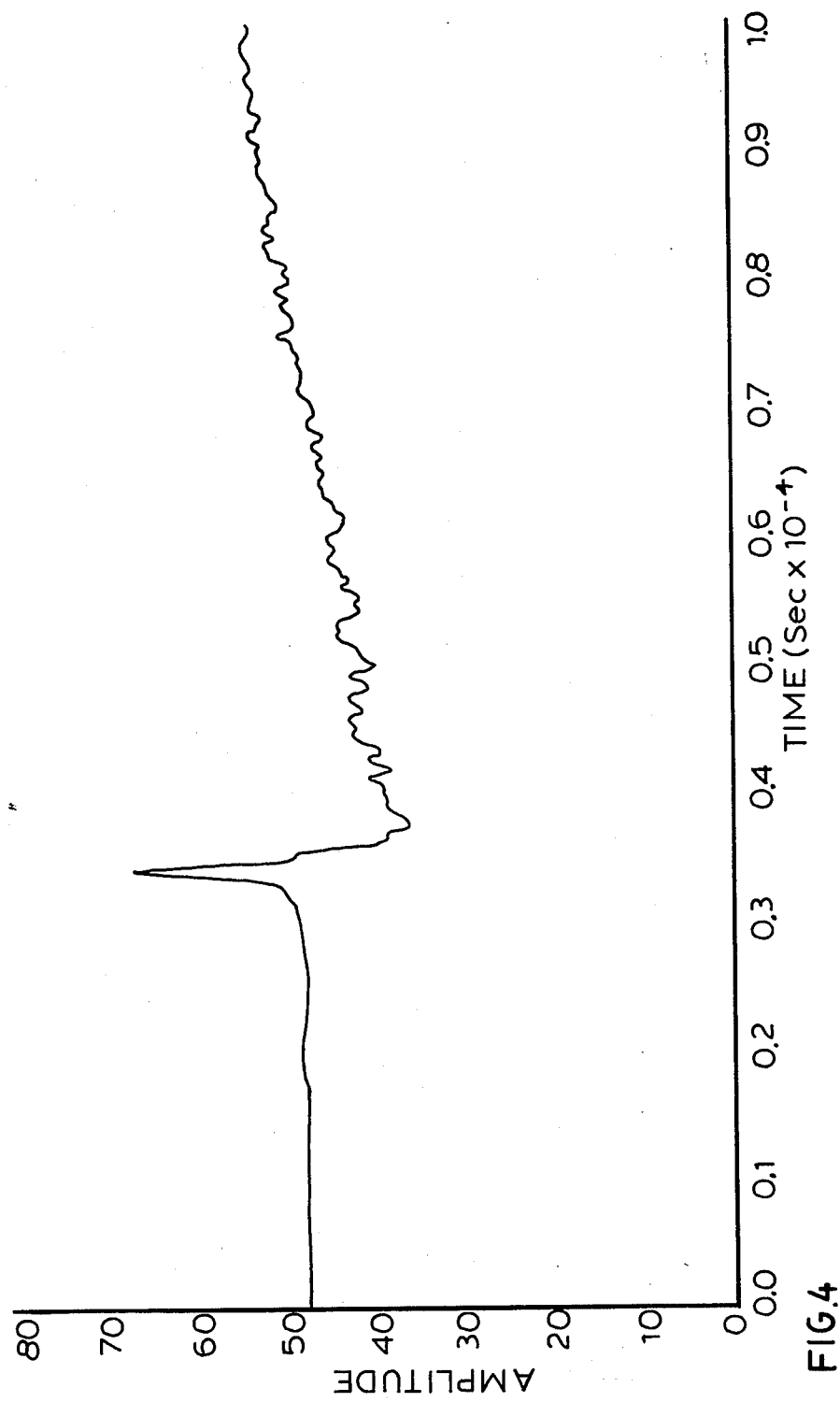
FIG. 4 is a comparative graph produced with the packaged device of the invention showing the improved signal output with the invention here with that improvement including a substantial reduction of the undershoot phenomenon of the NBS arrangement.

Referring now to FIG. 3, that figure shows a graph of the measured voltage output versus time for the NBS conical transducer described in the report mentioned above. By comparison, the graph shown in FIG. 4 is of measured voltage output versus time of the arrangement of apparatus in accordance with this invention. As will be seen, with the invention here, the undesirable undershoot problem has been substantially avoided.

Thus, as will be appreciated from the foregoing, there is provided in accordance with this invention an improved acoustic emission transducer specifically constructed for sensing surface flat sequence response displacement waveforms, and which transducer is arranged in a package which is of a rugged construction so that the transducer can be handled relatively roughly and in various orientations without destroying the effectiveness thereof. More importantly, because of the size of the instrument, it is far easier to use, and thus substantially more practical for many applications. It is much easier to handle and to use in mountings and the placement thereof in various difficult to reach locations.

Even so, the arrangement of transducer herein provides enhanced signal output avoiding the usual undesired undershoot in the response readings obtained from the output of the transducer. This is achieved because of the continuous pressure applied to the crystal sensor element so that the unbound surface thereof is maintained constantly in the intimate contact with the adjacent sensing surface which provides a rugged structure not subject to deterioration by jolting. Also, this is achieved because of the selection of a specific material having the highest mechanical impedance available relative to the crystal involved.

Obviously, all of the above serves to make the apparatus herein highly advantageous commercially because in the mounting of several such transducers for investigating a particular structure, the combined output of these transducers in a graphic display will be much improved over those of the prior art.

While the apparatus herein disclosed forms a preferred embodiment of this invention, this invention is not limited to that specific apparatus and changes can be made therein without departing from the scope of the invention which is defined in the appended claims. For example, it will be understood that a variation in the selection of the material for the housing will be made depending upon the material of which the structure of interest is made. Moreover, variations in the inertia mass providing the backing for the crystal sensor element will be made, depending upon the impedence of the crystal sensor involved since various tungsten alloys are available for this purpose, for example.

What is claimed is:

1. An acoustic emission transducer for sensing surface flat frequency response displacement waveforms in the surface of objects comprising
   (a) a piezoelectric member having an upper and a lower surface;
   (b) an inertia mass positioned adjacent said upper surface;
   (c) flow communication means interconnecting said mass to signal reading equipment for conveying the electrical output of said transducer to signal reading equipment;
the improvement comprising
   (d) a housing defining a compartment for said member and said mass, and having a base plate;
   (e) said lower surface of said member engaging said base plate;
   (f) means for selectively fixing one of said upper and lower surfaces of said member to the said adjacent surface of said mass and said base plate;
   (g) resilient means positioned between the surface of said mass opposite said member and said housing for continuously urging said mass against said member;
   (h) the lower portion of said housing is cylindrical; and
   (i) the upper portion of said housing is conical.

2. The apparatus of claim 1, further characterized by
   (a) the object to be tested is steel;
   (b) said housing is stainless steel; and
   (c) said mass is a tungsten base heavy alloy.

3. The apparatus of claim 1, further characterized by
   (a) said piezoelectric member is comprised of lead-zirconate-titanate.

4. The apparatus of claim 1, further characterized by
   (a) said piezoelectric member is in the form of a cylindrical flat plate.

5. The apparatus of claim 4, further characterized by
   (a) said mass is cylindrical with a truncated upper surface; and
   (b) said housing, said mass, and said member are coaxial.

6. The apparatus of claim 4, further characterized
   (a) said member is substantially about 0.05 inches in diameter and 0.025 inches thick.

7. The apparatus of claim 1, further characterized
   (a) said fixing means is an epoxy.

8. The apparatus of claim 7, further characterized
   (a) said epoxy is positioned between said mass and said member.

9. The apparatus of claim 1, further characterized
   (a) an integral electronic preamplifier in said flow communication means.

10. An acoustic emission transducer for sensing surface flat frequency response displacement waveforms in the surface of objects comprising
    (a) a piezoelectric member having an upper and a lower surface;
    (b) an inertia mass positioned adjacent said upper surface;
    (c) flow communication means interconnecting said mass to signal reading equipment for conveying the electrical output of said transducer to signal reading equipment;
the improvement comprising
    (d) a housing defining a compartment for said member and said mass, and having a base plate;
    (e) said lower surface of said member engaging said base plate;
    (f) means for selectively fixing one of said upper and lower surfaces of said member to the said adjacent surface of said mass and said base plate;
    (g) resilient means positioned between the surface of said mass opposite said member and said housing for continuously urging said mass against said member; and
    (h) said resilient means is an elastomer bulk extending between the upper surface of said mass and the upper surfaces of said housing compartment.

11. An acoustic emission transducer for sensing surface flat frequency response displacement waveforms in the surface of objects, comprising
    (a) a cylindrical piezoelectric member having an upper and a lower surface;
    (b) a cylindrical inertia mass positioned on said upper surface;
    (c) flow communication means interconnecting said mass to signal reading equipment for conveying the electrical output of said transducer to signal reading equipment;
the improvement characterized by
    (d) a cylindrical housing with a conical top surface defining a compartment for said member and said mass;
    (e) a base plate on said housing;
    (f) said lower surface of said member engaging said base plate;
    (g) said housing, said member and said mass being coaxial;
    (h) means for selectively fixing one of said upper and lower surfaces of said member to the said adjacent surface of said mass and said base plate; and
    (i) resilient means positioned between the top surface of said mass and said housing for continuously urging said mass against said member.

12. The apparatus of claim 11, further characterized by
    (a) the object to be tested is steel;
    (b) said housing is corrosion resistant, non-magnetic stainless steel;
    (c) said member is lead-zirconate-titanate;
    (d) said resilient means is an elastomer bulk extending between the upper surface of said mass and the inner top surface of said compartment; and
    (e) said mass is a tungsten base heavy alloy.

13. The apparatus of claim 12, further characterized by
    (a) said fixing means is an epoxy joining the mating surfaces of said mass and said piezoelectric member.

14. The apparatus of claim 12, further characterized
    (a) said member is substantially about 0.050 inches in diameter and 0.025 inches thick.

* * * * *